(12) United States Patent
Degtiarenko

(10) Patent No.: US 9,847,215 B2
(45) Date of Patent: Dec. 19, 2017

(54) METHOD FOR DETECTING AND DISTINGUISHING BETWEEN SPECIFIC TYPES OF ENVIRONMENTAL RADIATION USING A HIGH PRESSURE IONIZATION CHAMBER WITH PULSE-MODE READOUT

(71) Applicant: JEFFERSON SCIENCE ASSOCIATES, LLC, Newport News, VA (US)

(72) Inventor: Pavel V. Degtiarenko, Williamsburg, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 104 days.

(21) Appl. No.: 14/919,826

(22) Filed: Oct. 22, 2015

(65) Prior Publication Data

US 2016/0133447 A1     May 12, 2016

Related U.S. Application Data

(60) Provisional application No. 62/077,191, filed on Nov. 8, 2014.

(51) Int. Cl.
*H01J 47/08* (2006.01)
*G01T 1/18* (2006.01)
(Continued)

(52) U.S. Cl.
CPC ............. *H01J 47/08* (2013.01); *G01T 1/185* (2013.01); *G01T 3/008* (2013.01)

(58) Field of Classification Search
CPC . G01T 3/008; G01T 3/00; G01T 3/185; H01J 47/08
(Continued)

(56) References Cited

U.S. PATENT DOCUMENTS 6,836,523 B2 * 12/2004 Izumi ................... G01T 1/17
                                                       250/336.1
8,481,957 B2      7/2013 Guerard et al.
(Continued)

OTHER PUBLICATIONS

Langford, T.J. et al., "Event identification in 3He proportional counters using risetime discrimination", 2013, Nuclear Instruments and Methods in Physics Research A, vol. 717, pp. 51-57.*
(Continued)

*Primary Examiner* — David Porta
*Assistant Examiner* — Blake Riddick

(57) ABSTRACT

An environmental radiation detector for detecting and distinguishing between all types of environmental radiation, including photons, charged particles, and neutrons. A large volume high pressure ionization chamber (HPIC) includes $BF_3$ gas at a specific concentration to render the radiation detector sensitive to the reactions of neutron capture in Boron-10 isotope. A pulse-mode readout is connected to the ionization chamber capable of measuring both the height and the width of the pulse. The heavy charged products of the neutron capture reaction deposit significant characteristic energy of the reaction in the immediate vicinity of the reaction in the gas, producing a signal with a pulse height proportional to the reaction energy, and a narrow pulse width corresponding to the essentially pointlike energy deposition in the gas. Readout of the pulse height and the pulse width parameters of the signals enables distinguishing between the different types of environmental radiation, such as gamma (x-rays), cosmic muons, and neutrons.

3 Claims, 2 Drawing Sheets

(51) Int. Cl.
*G01T 3/00* (2006.01)
*G01T 1/185* (2006.01)

(58) Field of Classification Search
USPC .............. 250/390.01, 382, 374, 375, 370.05
See application file for complete search history.

(56) References Cited

U.S. PATENT DOCUMENTS

| | | | |
|---|---|---|---|
| 8,710,449 B2 | 4/2014 | Friedman | |
| 8,874,385 B2 | 10/2014 | Takayanagi et al. | |
| 9,046,613 B2 | 6/2015 | Ramsden et al. | |
| 9,116,249 B1 | 8/2015 | Claus et al. | |
| 2005/0023479 A1* | 2/2005 | Grodzins | G01T 3/06 250/390.11 |
| 2005/0092928 A1* | 5/2005 | Gerstenmayer | G01T 1/2935 250/374 |
| 2006/0138340 A1* | 6/2006 | Ianakiev | G01T 3/008 250/390.01 |
| 2008/0315091 A1* | 12/2008 | Morris | G01T 1/18 250/307 |
| 2011/0215251 A1* | 9/2011 | Guerard | H01J 47/02 250/385.1 |
| 2012/0175525 A1* | 7/2012 | Frank | G01T 3/06 250/390.01 |
| 2014/0077090 A1* | 3/2014 | Roy | G01T 1/2018 250/370.08 |
| 2014/0209812 A1* | 7/2014 | Baus | G01T 1/185 250/389 |
| 2016/0018538 A1* | 1/2016 | Bendahan | G01T 3/008 250/390.01 |
| 2016/0282481 A1* | 9/2016 | Sannie | G01T 1/20 |

OTHER PUBLICATIONS

Padalakshmi, M and Shaikh, A.M., "Effect of adding Ar gas on the pulse height distribution of BF3-filled neutron detectors", 2008, Pramana Journal of Physics, 88 (3), pp. 1177-1181.*
J.H. and Williams, A.W., "A high-pressure ionization chamber", 1977, Journal of Physics E: Scientific Instruments, vol. 10, pp. 547-551.*
Degtiarenko, Pavel, "New Techniques of Low Level Environmental Radiation Monitoring at JLab", Oct. 2010, pp. 2719-2723, vol. 57, No. 5, IEEE Transactions on Nuclear Science.

* cited by examiner

METHOD FOR DETECTING AND DISTINGUISHING BETWEEN SPECIFIC TYPES OF ENVIRONMENTAL RADIATION USING A HIGH PRESSURE IONIZATION CHAMBER WITH PULSE-MODE READOUT

This application claims the priority of Provisional U.S. Patent Application Ser. No. 62/077,191 filed Nov. 8, 2014.

The United States Government may have certain rights to this invention under Management and Operating Contract No. DE-AC05-06OR23177 from the Department of Energy.

FIELD OF THE INVENTION

The present invention relates to radiation detection and more particularly to detection of environmental radiation using a high pressure ionization chamber in combination with a pulse-mode readout.

BACKGROUND OF THE INVENTION

Conventional environmental radiation detectors typically include two general types, one being sensitive specifically to photons and charged particles, such as ionization chambers, and the other sensitive to neutrons, such as moderated proportional gas counters filled with boron trifluoride ($BF_3$) or $^3He$ gas. Currently, for detecting all types of environmental radiation, including photons, charged particles, and neutrons, two different types of radiation detector must be used.

Accordingly, it would be advantageous to provide a universal environmental radiation detector that is capable of both detecting and separating signals from photons, charged particles, and neutrons. A universal radiation detector would be useful in the field of environmental radiation monitoring, with potential applications including area monitoring around nuclear power plants, particle accelerator facilities, radioactive material storage facilities, and ports of entry, among other applications.

OBJECT OF THE INVENTION

It is therefore an object of the present invention to provide a universal environmental radiation detector that is capable of detecting and distinguishing between all types of environmental radiation, including photons, charged particles, and neutrons.

SUMMARY OF THE INVENTION

The present invention is an environmental radiation detector that is capable of detecting and distinguishing between all types of environmental radiation, including photons, charged particles, and neutrons. The universal radiation detector includes a large volume high pressure ionization chamber (HPIC) equipped with a pulse-mode readout by means of which the ionization energy produced by every detected particle can be measured, making such device crudely spectroscopic (Spectroscopic HPIC, or SHPIC). $BF_3$ gas is added to the high pressure ionization chamber at a proper concentration to render the radiation detector sensitive to the reactions of neutron capture in $^{10}B$ isotope. The heavy charged products of the capture reaction deposit significant characteristic energy of the reaction in the gas practically on the spot, producing a signal with a pulse height proportional to the reaction energy, and a narrow pulse width corresponding to the point-like energy deposition in the gas. The pulse height and the pulse width parameters of the signals are read from the detector to distinguish between the different types of environmental radiation, such as gamma (x-rays), cosmic muons, and neutrons.

DETAILED DESCRIPTION

Figure 1:
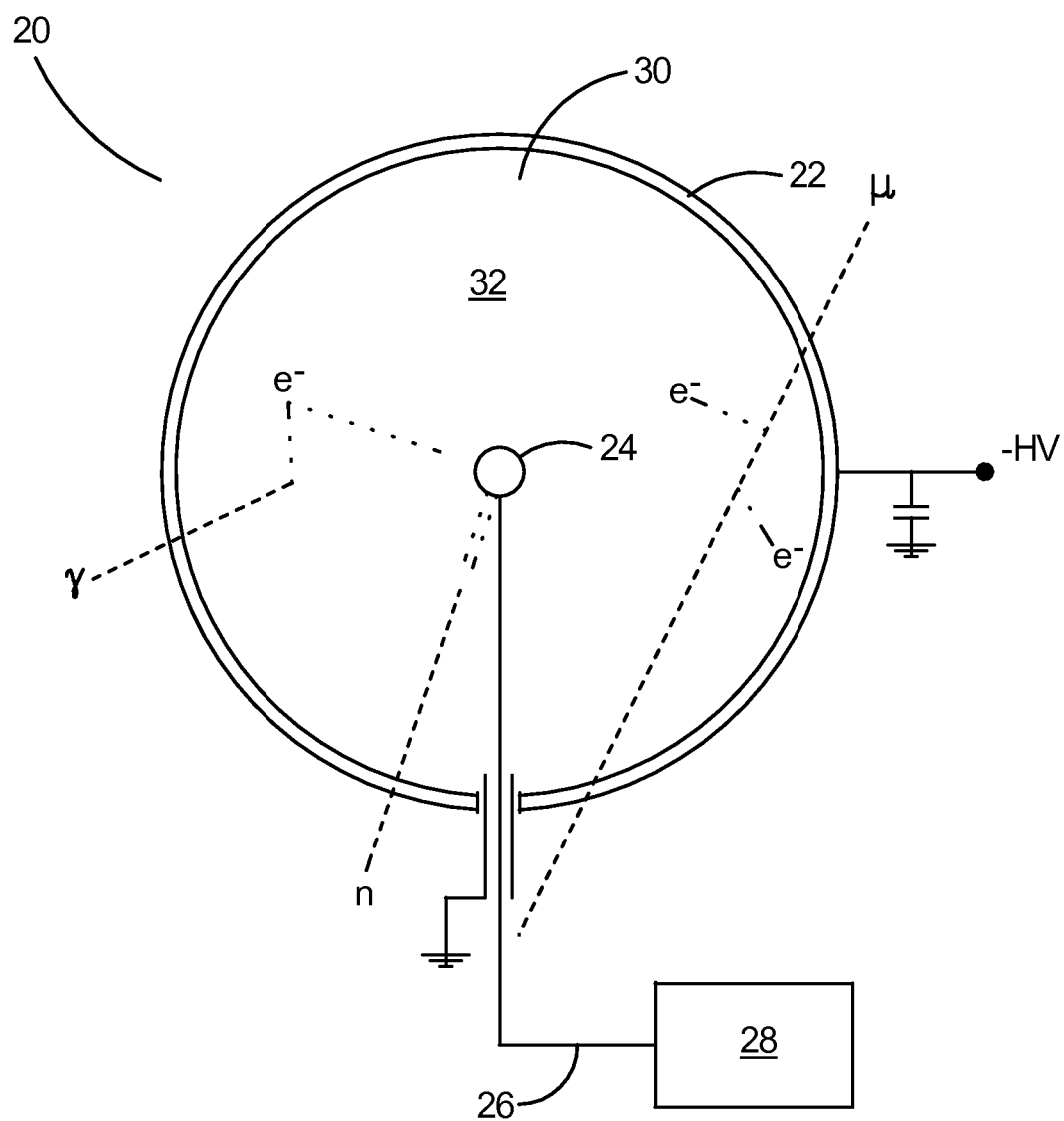
FIG. 1 is a schematic illustrating the universal environmental radiation detector of the present invention.

The present invention is a universal radiation detector that is capable of both detecting and identifying photons, charged particles, and neutrons. The universal radiation detector includes a large volume high pressure ionization chamber equipped with a pulse-mode readout, by means of which the ionization energy produced by every detected particle (pulse height), as well as the characteristic time extent during which the ionization charge is collected at the anode (pulse width), can be measured. $BF_3$ gas is added to the high pressure ionization chamber at a proper concentration to render the radiation detector sensitive to the reactions of neutron capture in $^{10}B$ isotope. The heavy charged products of the neutron capture produce high local ionization, and deposit significant characteristic energy of the reaction in the gas practically on the spot, producing a signal with a pulse height proportional to the reaction energy, and a narrow pulse width corresponding to the essentially pointlike energy deposition in the gas. The meaning of the term "essentially pointlike energy deposition" as used herein refers to the fact that the heavy charged products deposit significant characteristic energy of the reaction in the immediate vicinity of the reaction in the gas (essentially pointlike) producing a signal with corresponding narrow pulse width, and with its pulse height proportional to the reaction energy.

By measuring the pulse height and the pulse width parameters of the signals read from the detector it is possible to distinguish between the different types of environmental radiation, such as gamma (x-rays), cosmic muons, and neutrons.

Lower energy gamma and x-ray photons are detected in a SHPIC detector when they knock out electrons from the walls and from the gas molecules. The electrons propagate through the gas and lose their energy to ionization. As the energies of these electrons are low, they stop in the gas quickly, and the signals they produce are characterized by small pulse heights and small pulse widths. With increasing energy of the detected gamma photons the energy of the knocked-out electrons increases and their trajectories in the gas are becoming longer. Thus their signals are characterized by higher amplitudes and longer pulse widths.

High energy charged particles such as cosmic muons penetrate the detector and leave behind the trail of ionization electrons knocked from the gas. Such signals are generally characterized by a medium ionization energy deposited in the gas (about 1.2 MeV), and by the long pulse widths if the tracks are in the central region of the detector. The signals they produce at the region close to the walls are smaller and shorter, so they might be not that distinctive, but this contribution is relatively small.

The energy released in the process of thermalized neutron capture reaction on $^{10}$B nucleus is large, about 2.7 MeV, which is larger than the expected maximum energy of gammas typically present in the environment, so the pulse height measurement alone could give a good means to separate neutron signals from everything else. Using the pulse width parameter makes such separation significantly more robust. In the neutron capture reaction on $^{10}$B nucleus the two charged products carrying the full energy of the reaction, are the heavy ions $^7$Li and $^4$He. They both produce heavy local ionization in the gas, and deposit all their energies at a distance of the order or less than few millimeters. Thus the pulse width characteristic parameter for this reaction is expected to be significantly smaller than the pulse widths characteristic of the gammas and charged particles with the same pulse height. Using both pulse height and pulse width parameters in the signal analysis algorithm makes the separation of neutron events reliable.

The long term stability and reliability of operation in a wide range of ambient outdoor conditions, as demonstrated by successful SHPIC detector operation at the Jefferson Lab in Newport News, Va., make it very attractive for use as a universal radiation monitor for a wide range of applications.

With reference to FIG. 1 there is shown a preferred embodiment of a radiation detector according to the present invention. The radiation detector 20 includes a shell or cathode 22, an anode 24, an electrical circuit 26, and a pulse-mode readout device 28. The shell or cathode 22 includes an inner volume 30 that is filled and hermetically sealed with a mixture of inert gas 32 and boron trifluoride (BF$_3$). Preferably, the inert gas portion of the mixture is helium, neon, argon, krypton, xenon, or a mixture of those. The gas mixed with BF$_3$ could furthermore be a non-inert as long as it is non-reactive with BF$_3$. The gas mixture is preferably maintained at a pressure of between 15 and 20 atmospheres with the BF$_3$ gas in the argon preferably at a partial pressure of between 5 and 15%. FIG. 1 further depicts the various events that can be detected by the radiation detector including gamma rays (γ), neutrons (n), and cosmic muons (μ). A bias voltage is applied to the external shell 22 in order to allow for fast electron capture at the anode 24.

One potential layout of an electrical circuit for a pulse-mode readout of the present invention is provided in P. Degtiarenko and V. Popov, "New Techniques of Low Level Environmental Radiation Monitoring at JLab", IEEE Transactions on Nuclear Science, Vol. 57, No. 5, p. 2719-2723, October 2010, which is incorporated herein in its entirety by reference.

Figure 2:
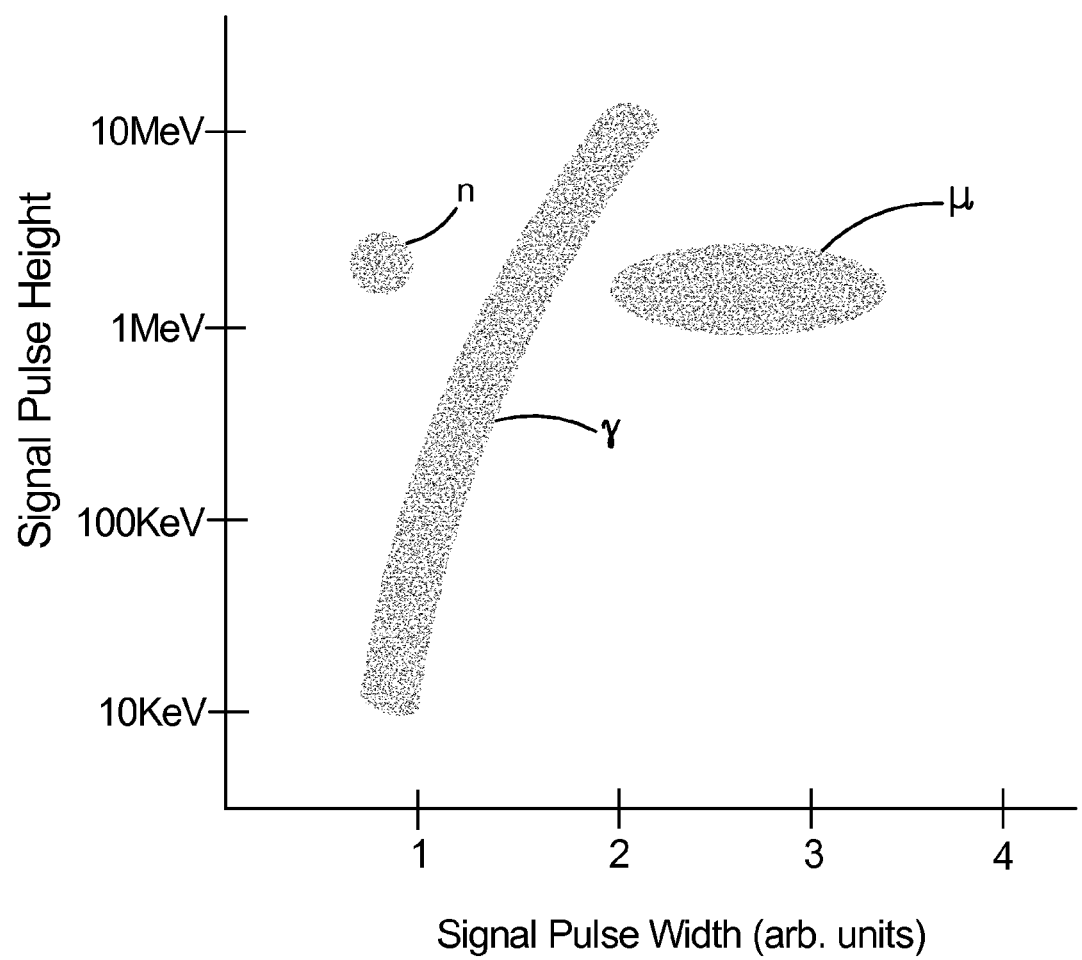
FIG. 2 is a plot depicting the pulse height and pulse width parameters with respect to different types of environmental radiation including gamma rays ($\gamma$), neutrons (n), and cosmic muons ($\mu$), which penetrate from the environment through the detector walls and into the gas mixture.

Referring to FIG. 2, it is possible by measuring the pulse height and pulse width parameters to distinguish between the different types of environmental radiation, such as gamma rays (γ), neutrons (n), and cosmic muons (μ), which pass through the cathode 22 and into the gas mixture 32. As shown in FIG. 2, each type of radiation (γ, n, or μ) may interact in the wall or in the gas, resulting in the ionization events in the gas. Cosmic muons traverse the inner volume 30 and leave the track of ionization electrons knocked from the gas along their trajectory. Gammas interact with atoms in the walls or the gas, and produce the relatively energetic electrons in the gas, which result in the (shorter) tracks of ionization electrons. The length of their trajectories in the gas depends on their energy. Neutrons captured by the $^{10}$B isotope cause the resulting compound nucleus to decay into the heavy charged fragments which stop in the gas at very short distances, depositing characteristic energy of the reaction in the gas. All interactions produce signals with characteristic pulse heights proportional to the reaction energy, and characteristic pulse widths. The specific type of radiation is then determined by applying an appropriate algorithm to the output of the pulse-mode readout device 28. Applying the algorithm distinguishes between the different types of environmental radiation, such as gamma rays (γ), neutrons (n), and cosmic muons (μ).

The universal radiation detector combines the capabilities of several conventional detectors, including simultaneous detection of gamma rays, charged particles, and neutrons within one system, with extremely good sensitivity and stability.

A universal radiation detector according to the present invention is capable of covering the range of environmental dose rates expected to be encountered in a wide range of applications.

As the invention has been described with reference to a specific embodiment, it will be apparent to those skilled in the art that the same may be varied in many ways without departing from the spirit and scope of the invention. Any and all such modifications are intended to be included within the scope of the appended claims.

What is claimed is:

1. A method for detecting environmental radiation, comprising:
  a. providing a high pressure ionization chamber (HPIC) including a shell having an inner volume and an anode within the inner volume;
  b. adding inert gas to the inner volume of the HPIC;
  c. adding boron trifluoride (BF$_3$) gas to the inner volume of the HPIC at a concentration to comprise 5 to 15% BF$_3$ of the gas mixture to render the HPIC sensitive to Boron-10 isotope neutron capture reactions;
  d. applying a negative bias voltage to the shell to create a cathode;
  e. connecting an electrical circuit to the anode;
  f. connecting a pulse-mode readout device to the electrical circuit; and
  g. detecting various types of environmental radiation using the output of the pulse-mode readout device;
  h. measuring the signal pulse height and signal pulse width of the output of the pulse-mode readout device; and
  i. comparing the signal pulse width of the output of the pulse-mode readout device with characteristic pulse width parameters to distinguish between gamma rays (γ), neutrons (n), and cosmic muons (μ).

2. The method of claim 1 wherein the inert gas and BF$_3$ gas mixture in the HPIC is maintained at a pressure of between 15 and 20 atmospheres.

3. The method of claim 1 wherein the inert gas is selected from the group including helium, neon, argon, krypton, xenon, or a mixture thereof.

* * * * *

UNITED STATES PATENT AND TRADEMARK OFFICE
CERTIFICATE OF CORRECTION

PATENT NO. : 9,847,215 B2
APPLICATION NO. : 14/919826
DATED : December 19, 2017
INVENTOR(S) : Degtiarenko et al.

Page 1 of 1

It is certified that error appears in the above-identified patent and that said Letters Patent is hereby corrected as shown below:

On the Title Page

Item (12) "Degtiarenko" should read -- Degtiarenko, et al. --.

Item (72) Inventor is corrected to read:
-- Pavel V. Degtiarenko, Williamsburg, VA (US);
Vaclav Vylet, Yorktown, VA (US) --.

Signed and Sealed this
Fourth Day of December, 2018

Andrei Iancu
*Director of the United States Patent and Trademark Office*